Figure 1:
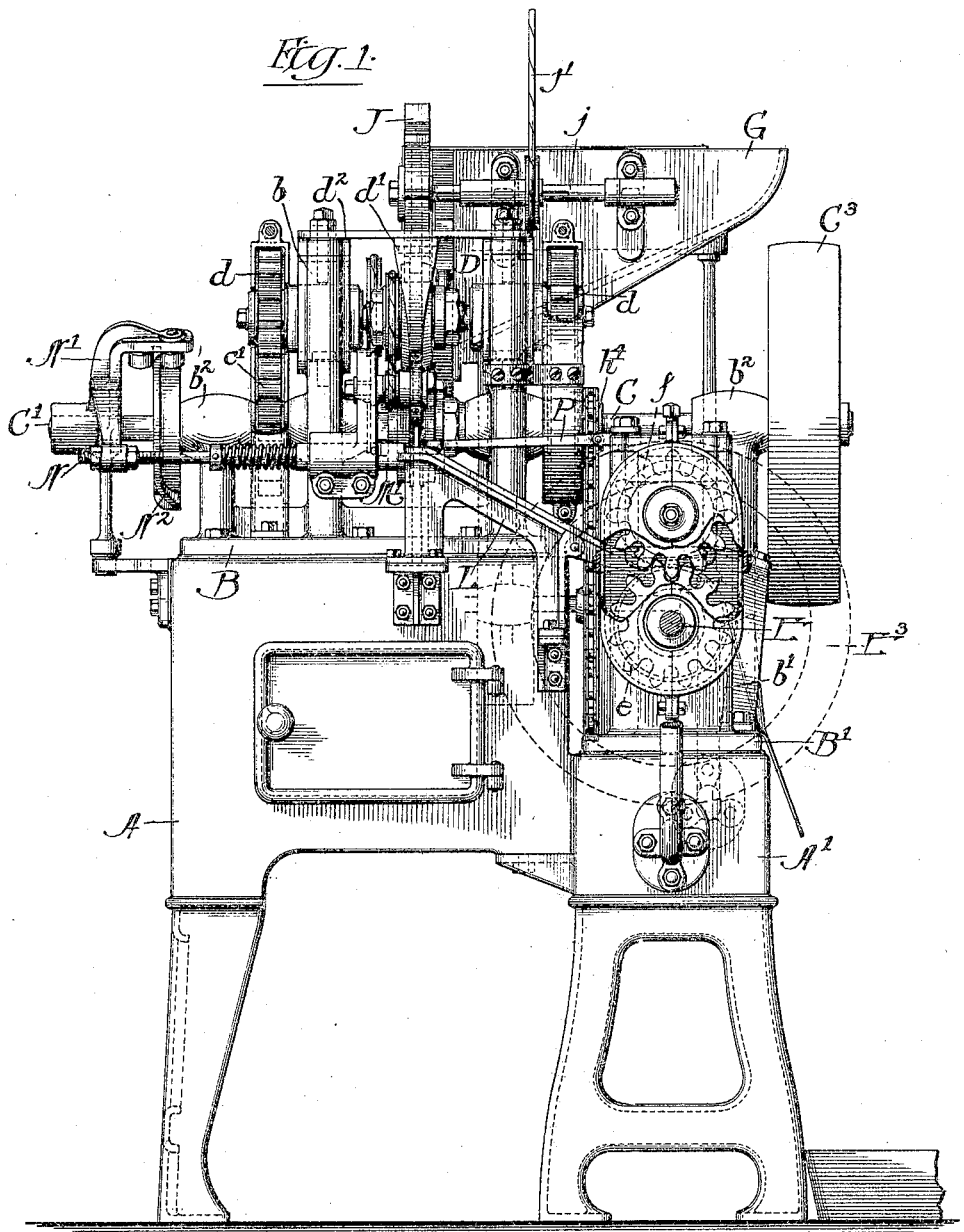

No. 794,221. PATENTED JULY 11, 1905.
J. H. HASKINS.
BLANK TRIMMING MACHINE.
APPLICATION FILED APR. 25, 1904.

8 SHEETS—SHEET 3.

Witnesses:-
Louis M. F. Whitehead
P. H. Alfredo.

Inventor:-
James H Haskins
By Chas. M. Chambers.
Attorney.

No. 794,221. PATENTED JULY 11, 1905.
J. H. HASKINS.
BLANK TRIMMING MACHINE.
APPLICATION FILED APR. 25, 1904.
8 SHEETS—SHEET 4.
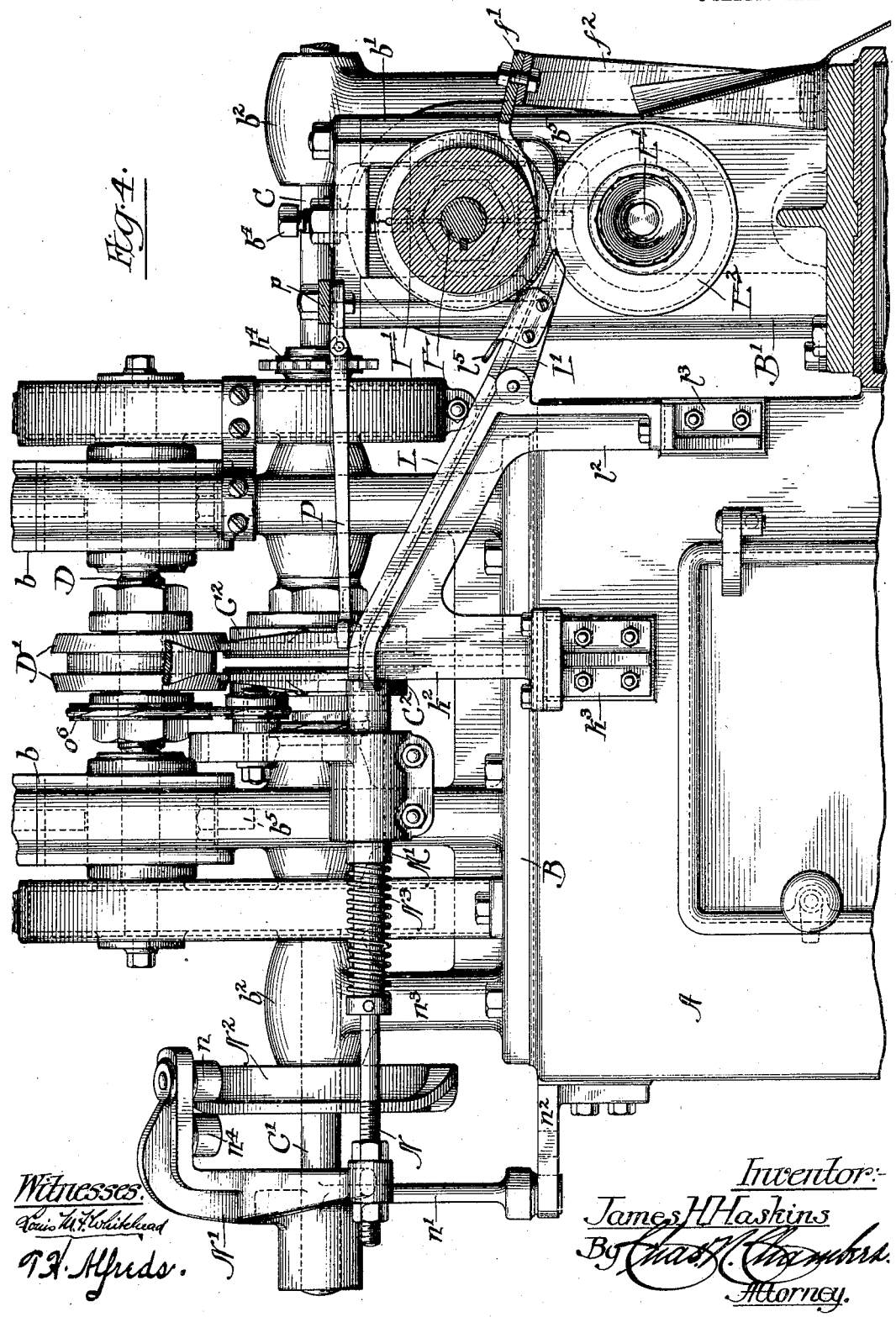

No. 794,221. PATENTED JULY 11, 1905.
J. H. HASKINS.
BLANK TRIMMING MACHINE.
APPLICATION FILED APR. 25, 1904.

8 SHEETS—SHEET 5.

Witnesses:— Inventor:—
James H. Haskins
By Chas. N. Chambers
Attorney.

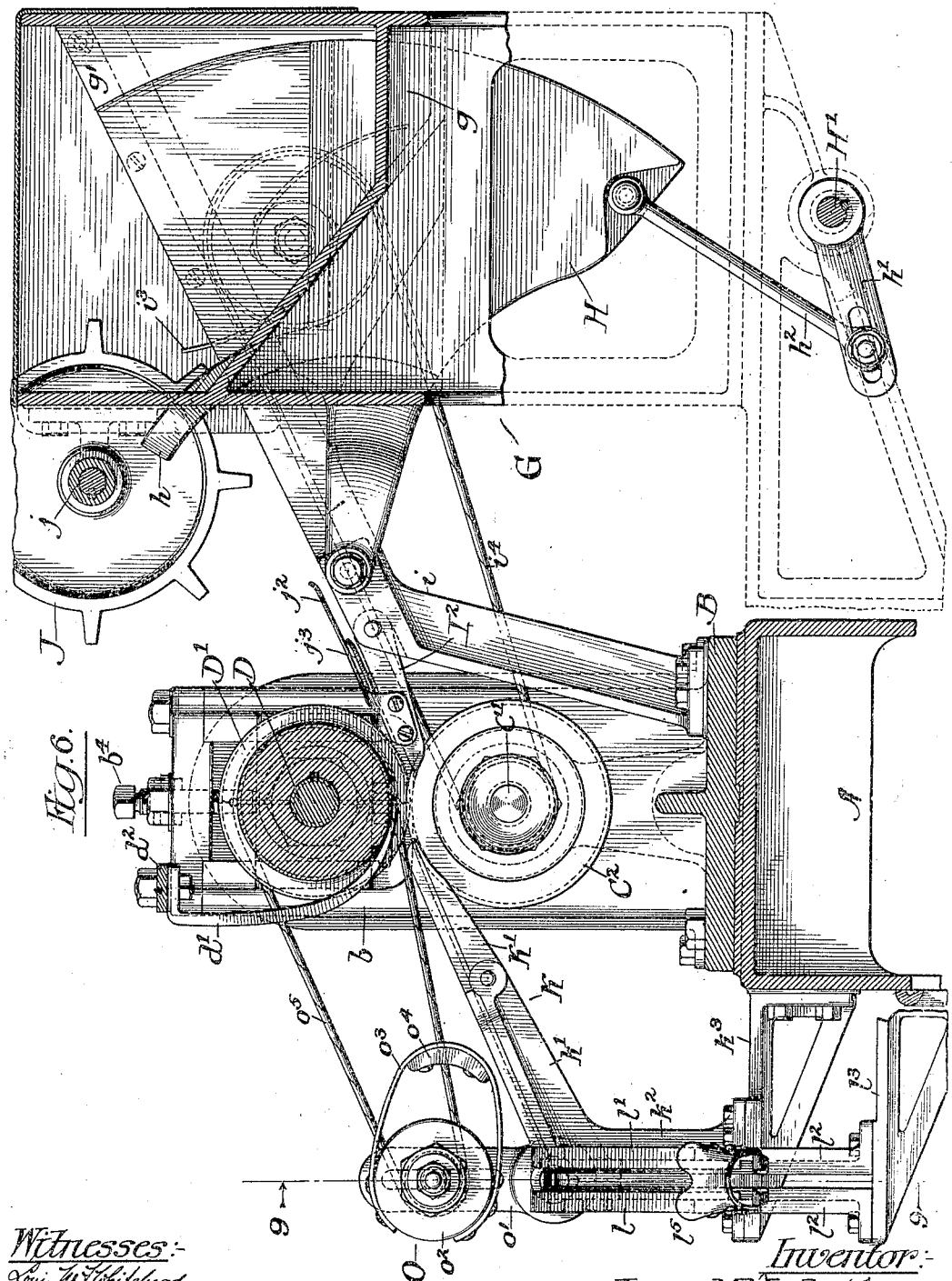

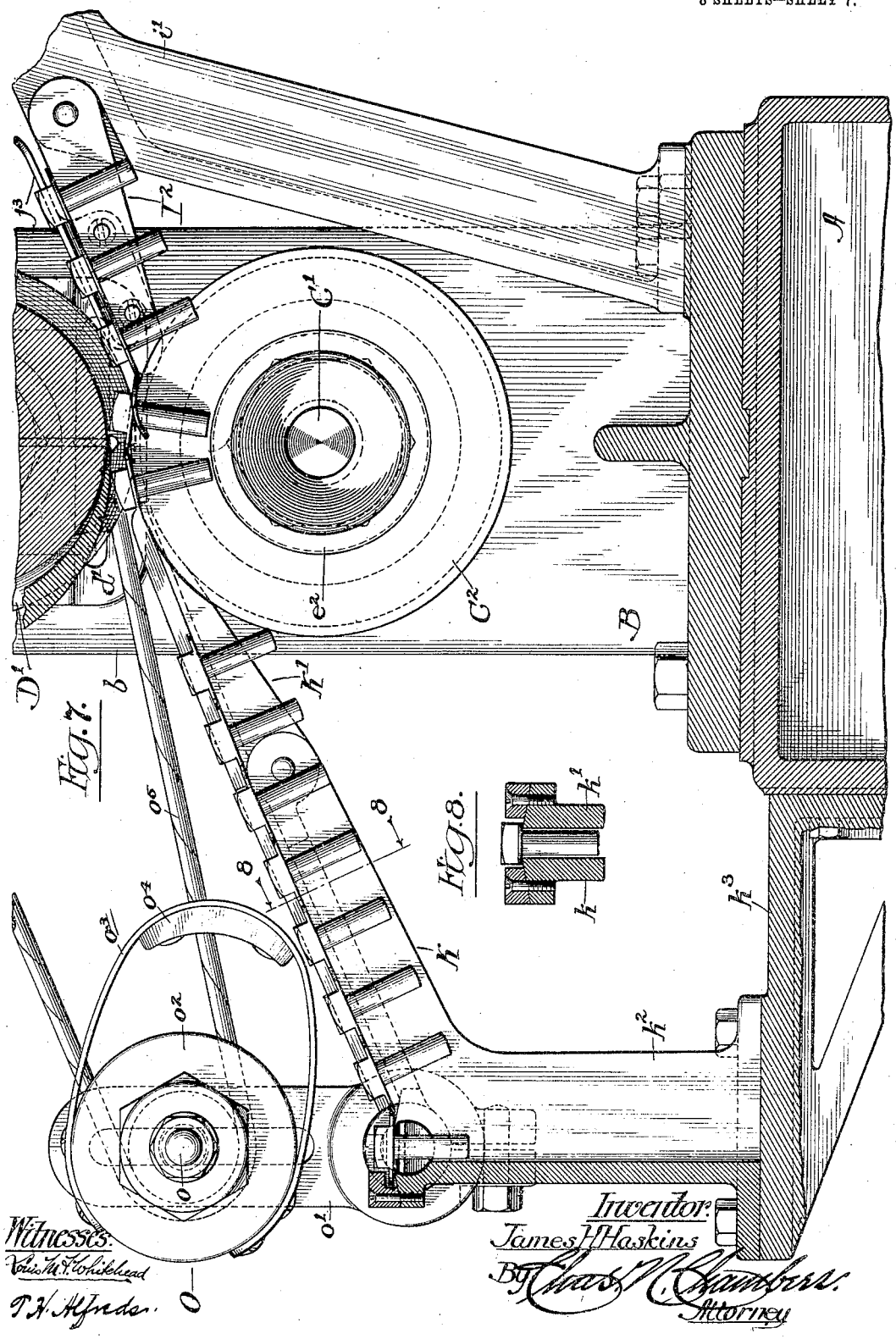

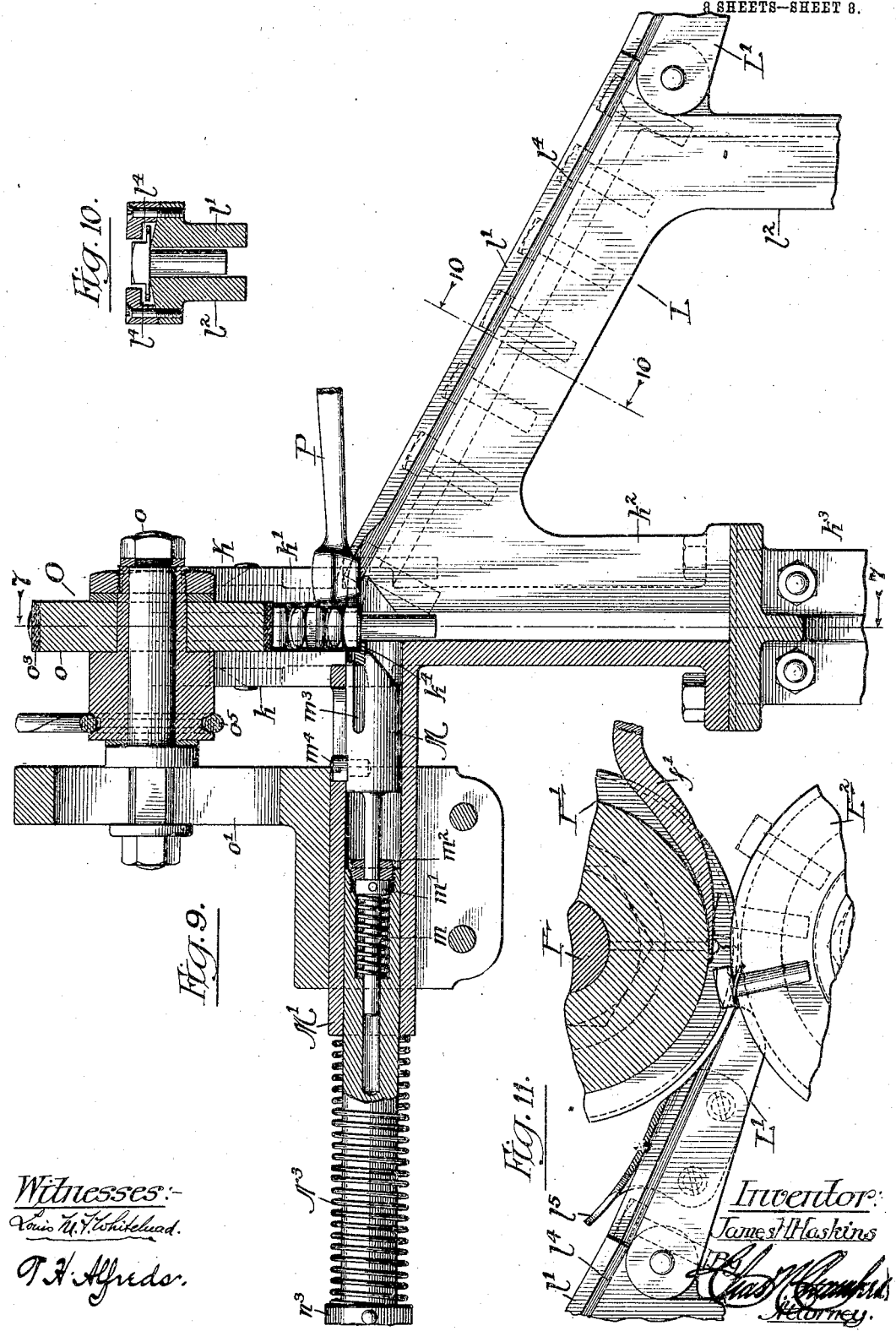

No. 794,221. Patented July 11, 1905.

UNITED STATES PATENT OFFICE.

JAMES H. HASKINS, OF SAN DIEGO, CALIFORNIA, ASSIGNOR OF ONE-HALF TO INTERNATIONAL HARVESTER COMPANY, OF CHICAGO, ILLINOIS, A CORPORATION OF NEW JERSEY.

BLANK-TRIMMING MACHINE.

SPECIFICATION forming part of Letters Patent No. 794,221, dated July 11, 1905.

Application filed April 25, 1904. Serial No. 204,660.

*To all whom it may concern:*

Be it known that I, JAMES H. HASKINS, a citizen of the United States, and a resident of San Diego, in the county of San Diego and State of California, have invented certain new and useful Improvements in Blank-Trimming Machines, of which the following is a specification, such as will enable those skilled in the art to which it appertains to make and use the same.

The invention relates, in general, to machines for trimming the "fins" from forged blanks. Specifically, it relates to machines adapted to trim the fins from forged bolts having polygonal-shaped heads.

It has for its general object to provide means for arranging the blanks in position to be operated upon and to provide means for trimming the fins from each blank by successive operations. Its specific object is to provide means adapted automatically to feed the bolts and arrange the heads thereof in position to be operated upon; to provide cutters adapted to trim the fins from one or more sides of the heads as they pass through in succession, whereby the operation is made continuous; to provide succeeding cutters adapted to trim the fins from the remaining sides of the heads; to provide a plurality of intersecting ducts or channels adapted to receive the bolts from one set of cutters and to deliver the same to a succeeding set, and to provide means adapted to deflect the bolts from one duct into the intersecting duct in position for the remaining fins to be trimmed off by the succeeding cutters.

Other objects of the invention and improvements in the construction of machines of this type will be made evident as the description proceeds.

The most economical way of making a bolt is to upset the bolt-stock into a die of the desired shape and size of the head of the bolt by a single operation. In order that the die may be completely filled and the head perfect in its shape, it is necessary to provide a little more metal than will just fill the die. In consequence of this a fin or thin projection is always left around the lower edge of the head, which must be trimmed off before the bolt has any commercial value, especially if it be of the machine-bolt type, in which the head is polygonal in cross-section. A number of machines have heretofore been made for trimming off these fins, most of which make use of a die of the proper size and shape, through which the head of the bolt is forced by a punch. Various devices are used in connection therewith to locate the heads in proper registration with these dies when they are polygonal in shape. All of these machines have been intermittent in their operation and most of them adapted to be fed by hand. None prior has been made automatic and continuous in its operation. The present invention, an embodiment of which is shown in the accompanying drawings, however, is both automatic and continuous in its operation. The bolts are shoveled into a hopper, from which they are automatically fed to a set of rotating cutters, which trim off the fins on two opposite sides of the heads. They are then passed along and deflected at a predetermined angle, so that two other untrimmed sides are presented to a succeeding set of rotating cutters and the fins trimmed therefrom. If there remain other sides which are untrimmed, the operation is repeated. They are again deflected so that the untrimmed sides are presented to still another set of rotating cutters and the fins trimmed off, and so on until all the sides are trimmed.

Figure 2:
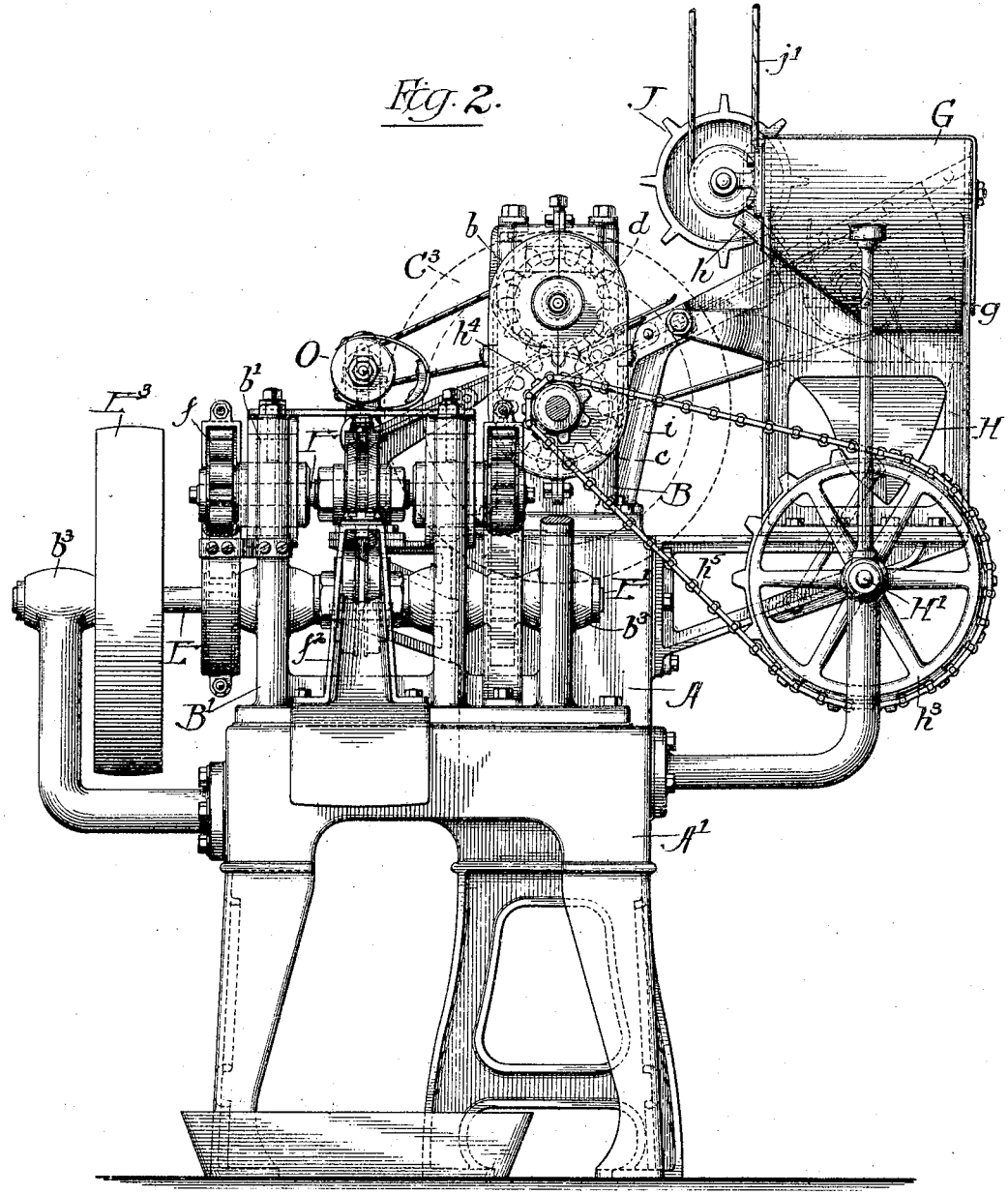
Figure 3:
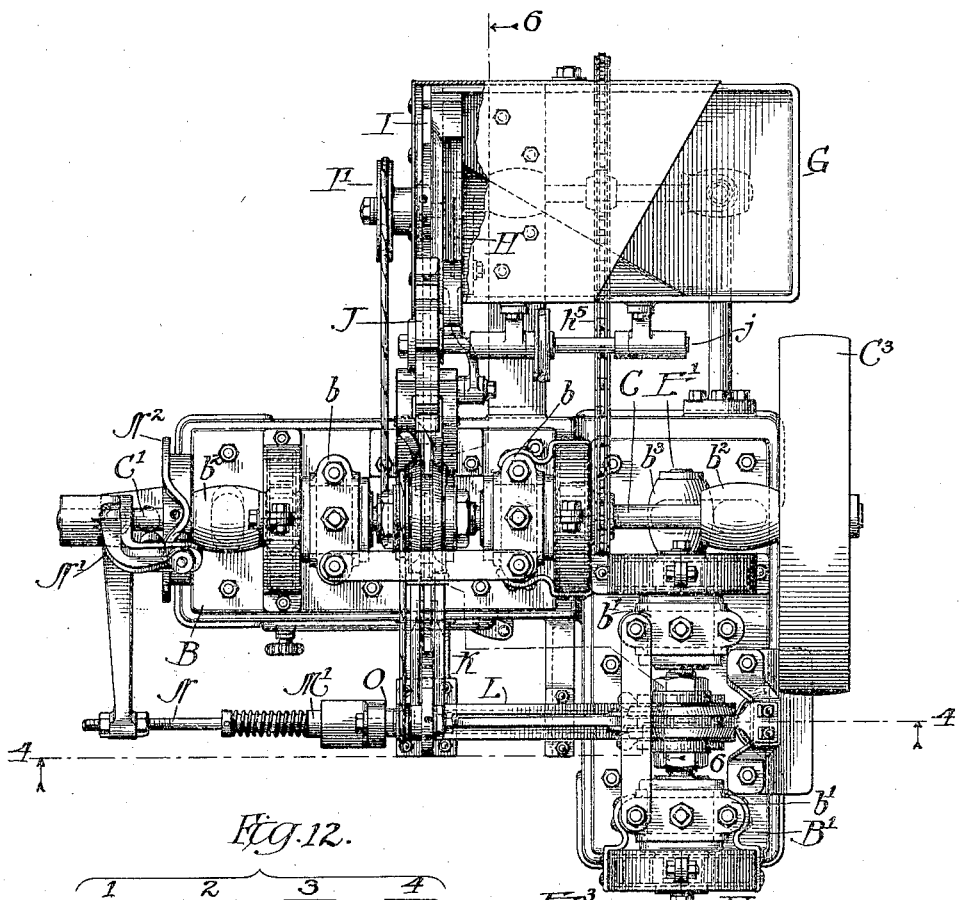
Figure 12:
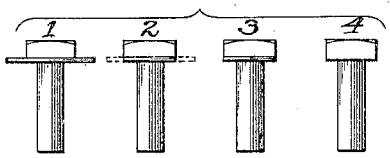
Figure 13:
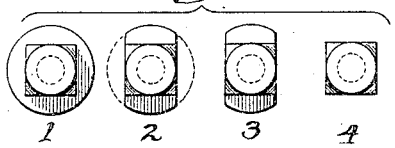
Figure 5:
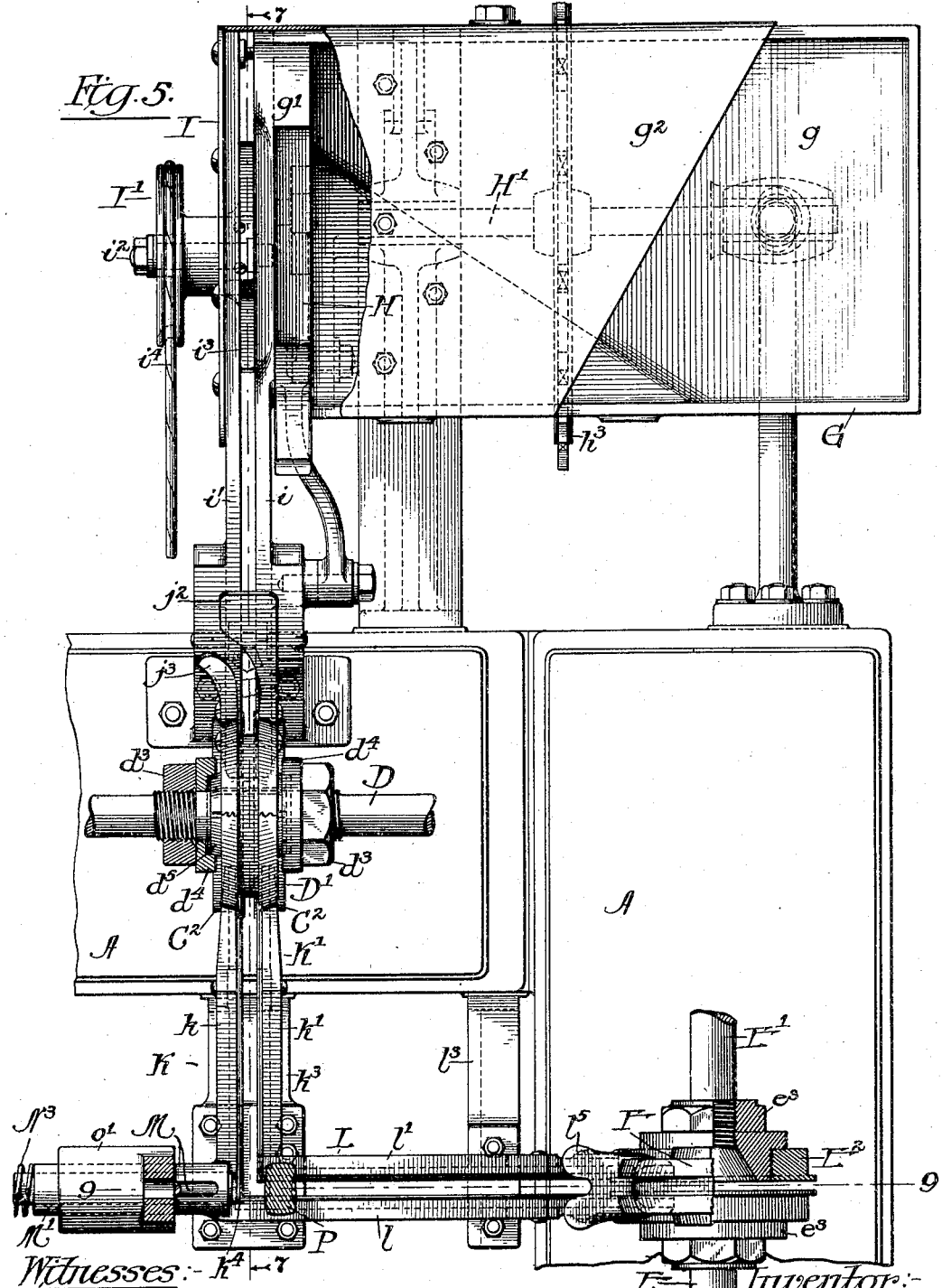

Referring to the drawings forming a part hereof, in which like characters of reference designate like parts, Figure 1 is a front elevation of the machine, showing the driving fly-wheel for the secondary shear removed and certain other parts broken away, so as to illustrate better the construction. Fig. 2 is a side elevation of the machine, showing the driving fly-wheel for the primary shear removed and parts broken away corresponding to those shown broken away in Fig. 1, so as to illustrate better the construction. Fig. 3 is a plan view of the machine, showing the cover of the hopper partly broken away. Fig. 4 is a fragmentary sectional elevation made on an enlarged scale and taken on planes indicated by the broken line 4 4 of Fig. 3, in which the stripper for the primary shear and the revolving forwarder are shown broken away. Fig. 5 is a fragmentary plan view, partly in section, made on the same scale as Fig. 4, showing the construction of the upper cutter of the primary shear and the lower cutter of the secondary shear. From this view the illustration of the driving-gearing has been omitted and the cover for the hopper partly broken away to show the construction of the feeder. Fig. 6 is a fragmentary sectional elevation made on the same scale as Figs. 4 and 5 and taken on planes indicated by the broken line 6 6 of Fig. 3, showing the construction of the hopper and the chutes and the relation of the hinged portions of the chutes to the primary shear. Fig. 7 is a fragmentary sectional elevation made on a still larger scale and taken on a plane indicated by the line 7 7 of Figs. 5 and 9, showing the primary shear, the manner of its operation, the position of the bolts therein and in the chutes adjacent thereto, and the location of the revolving forwarder. Fig. 8 is a transverse sectional elevation taken on a plane indicated by the line 8 8 of Fig. 7, showing the structure of the chute and the position of the bolt in it after the first operation. Fig. 9 is a fragmentary sectional elevation made on the same scale as Fig. 7 and taken on a plane indicated by the line 9 9 of Figs. 5 and 6, showing the structure of the deflector and the location of the gate opposite thereto. Fig. 10 is a transverse sectional elevation taken on a plane indicated by the line 10 10 of Fig. 9, showing the structure of the chute and the position of the bolt in it prior to the second operation. Fig. 11 is a fragmentary sectional elevation of the secondary shear, corresponding to Fig. 9, showing the manner of its operation and the relation of the hinged portion of the chute to the shear. Figs. 12 and 13 are respectively elevations and plans of a bolt, showing the successive steps in the operation performed by the machine.

In general the machine consists of a plurality of shears, a suitable feeder therefor, ducts or channels connecting the same, means for arranging the bolts therein in position to be operated upon, and means for driving the operative parts.

A bed for the machine is provided, which is formed of a longitudinal portion A and a transverse portion A', preferably made integral therewith, which latter is somewhat lower in elevation than the former, as shown in Figs. 1 and 2. Mounted upon the longitudinal portion is the primary shear and mounted on the transverse portion is the secondary shear, which are provided with bearing frames or housings B and B', having pillow-blocks $b$ and $b'$, respectively. Both of these shears are herein shown of the multiple form; but it is evident that this form is not essential to the operation of the machine. Journaled in bearings in the lower portion of the pedestals of the pillow-blocks $b$ and in bearings $b^2$ are shafts or spindles C and C', to the inner ends of which are secured by suitable means circular cutters $C^2$. Mounted in the pillow-blocks $b$, above the shafts C and C', is a shaft or spindle D, to which is secured circular cutters D', which are located thereon so as to register with the cutters $C^2$ in a manner to be pointed out later. Secured to the opposite ends of the shaft D are spur-gears $d$, which mesh, respectively, with corresponding spur-gears $c$, secured to the shafts C and $c'$, keyed to shaft C', but adapted to slide longitudinally thereon. The shaft C, which is the driving-shaft for the primary shear, has secured at its outer end a driving fly-wheel $C^3$, which is connected with any suitable source of power. By these means the circular cutters D' are rotated with and in a direction opposite to that of the circular cutters $C^2$. (See Figs. 1, 2, 3, and 4.)

Shafts or spindles E and E' are mounted in bearings in the pedestals of the pillow-blocks $b$ and in bearings $b^3$ in a manner corresponding to that in which the shafts C and C' are journaled, as above described, and carry at their inner end circular cutters $E^2$. A shaft or spindle F is also mounted in the pillow-blocks $b$ and carries circular cutters F', which register with the circular cutters $E^2$ in the same way that the cutters D' register with the cutters $C^2$. The shaft F carries at each end spur-gears $f$, which mesh, respectively, with spur-gears $e$, secured to the shafts E and $e'$, keyed to shaft E', but adapted to slide longitudinally thereon, and are identical with and serve the same purpose as the corresponding gears $d$, $c$, and $c'$ above described. The shaft E, which is the driving-shaft for the secondary shear, has secured near its outer end the driving fly-wheel $E^3$, which is connected with any suitable source of power. In other words, the two shears are mounted and driven in substantially the same manner.

Mounted upon suitable brackets secured to the bed of the machine at the rear thereof is the feeder having a hopper G, which is made in a shape common to hoppers of this class— that is, it has an inclined bottom $g$, which is preferably inclined in two or more directions toward one of the sides, which is substantially vertical. (Best shown in Figs. 5 and 6). A sector-shaped feed-plate H is pivotally connected with the hopper by means of a bracket $i$, which is secured to the bed of the machine and which is preferably integral with the side $g'$ at the delivery end of the hopper. This feed-plate vibrates in a slot in the hopper adjacent to the side $g'$ and is provided with arc-shaped finger $h$, which forms a closure for the slot when the feed-plate is in its lowest position. Journaled in bearings in the brackets which support the hopper is the shaft H', to one end of which is secured a crank $h'$, which is connected with the feed-plate H by means of a suitable pitman or link $h^2$. At the opposite end of this shaft is secured a sprocket-wheel $h^3$, which is connected with a corresponding sprocket-wheel $h^4$, secured to the driving-shaft C by means of a link belt $h^5$. By these means the sector-shaped feed-plate is vibrated in the slot of the hopper, so as to descend to the bottom thereof and rise almost to the top.

The duct or channel provided to connect the feeder and the primary shear is herein shown in the form of a chute I. This feed-chute lies just outside of the hopper and adjacent to and parallel with the feed-plate and in line with the upper edge thereof when in its uppermost position. It is formed of the bracket $i$ and the side $g'$ and a corresponding bracket $i'$, which is also secured to the bed of the machine and to the hopper. It will be seen that the feed-plate when it descends to the bottom of the hopper allows a quantity of bolts with which the hopper is filled to slide down over the top edge thereof, which bolts are raised thereby when the plate rises. The upper edge of the feed-plate being inclined outward causes the bolts to slide therefrom into the chute, the body dropping through the slot therein and being supported by the heads which engage the top thereof. To hasten the movement of the bolts in the feed-chute I so as to make room for others subsequently raised by the feed-plate, a rotating forwarder I' is journaled beneath the chute on a stud-bolt $i^2$, secured to the hopper, and is provided with yielding arms $i^3$ so located that they revolve in the slot of the chute. These arms, herein shown two in number, are curved rearward relative to their direction of rotation, as shown by dotted lines in Figs. 2 and 6. This forwarder receives its motion from the shaft C' by means of a belt $i^4$.

The means for arranging the bolts in the feed-chute in proper position to be operated upon, as herein shown, consist of a retarding-wheel and retarding and alining plates. (See Figs. 5, 6, and 7.) The retarding-wheel or knocker J is secured to a shaft $j$, which is journaled in suitable bearings secured to the front of the hopper and is rotated from any source of power by means of a belt $j'$. This retarding-wheel is located immediately above the feed-chute and is so close to it that only the head of a single bolt may pass beneath it. In case one bolt is piled on top of another the upper one is thrown back by the wheel, the cover $g^2$ preventing its being thrown out of the hopper. By these means a mass of bolts is prevented from sliding down the chute, which would congest the entrance to the primary shear and prevent the proper operation of the shear. The retarding and alining plates are secured to opposite sides of the chute near its delivery end, which lies between the two pairs of circular cutters of the shear just mentioned. The retarding-plate $j^2$ is provided at its upper end with a portion which extends over the top of the chute just above the heads of the bolts, which serves to retard such bolts as may still be piled on top of a preceding one, so that one only goes through at a time. At its lower end it is provided with a portion which is parallel with the chute and lies in the plane of and in contact with the heads of the bolts which coöperates with the alining-plate next referred to. The alining-plate $j^3$ serves to aline the heads of the bolts with the chute by contacting with the heads of those which are cornerwise, so that they enter the shear in proper position to be operated upon.

The cutters D' of the primary shear are so adjusted with respect to each other that the space between them is just equal to the width of the head of a bolt, and the cutters $C^2$ are so adjusted that the space between them is slightly greater than the diameter of the body of a bolt. The cutters of each pair are located equidistant from a common medial plane and in such a relation to the cutters of the opposite pair that they contact, so that one cuts against the other, as best shown in Figs. 4, 5, and 6. It will be seen, then, that as the bolts which are fed at the entrance of these cutters pass through, their bodies hang between the cutters $C^2$ and their heads rest on the top of the same cutters and between the cutters D'. Whatever fins there are on the edges of the heads will be cut off on opposite sides as they are carried through by the cutters. To make a clean cut, the cutters of the lower pair are grooved or rabbeted slightly, as shown in Figs. 5, 7, and 11, so that the cutters of the upper pair may pass beyond the circumference whereby a rotary shear cut is produced. On the opposite side of these cutters from the feed-chute is mounted a stripper $d'$, which extends in between the upper cutters and just above the heads of the bolts. It is secured to a bar $d^2$, mounted on top of the pillow-blocks $b$, and extends beyond the circumference of the cutters, so that as the bolts pass through the heads thereof are stripped out of the cutters. It is evident that the object of mounting the cutters $C^2$ on separate shafts is to adapt the machine to handle bolts of any desired length without making the lower cutter excessively large, thus increasing its efficiency. To adapt the cutter to larger bolts, it is only necessary to adjust the upper cutters the proper distance apart and the lower ones correspondingly, or the lower ones may be removed and others of suitable proportion inserted. At the exit of these cutters is provided a receiving-chute K a cross-section of which is shown in Fig. 8, which shows the upper portion to be just wide enough to accommodate the heads of the bolts minus the fins which have just been sheared off and the lower portion just wide enough for the bodies of the bolts. At the lower end of this chute is located a delivery or second feed-chute L, which is inclined at an angle thereto, which angle is determined by the shape of the head. As herein shown, it is ninety degrees, since the bolts which the machine is adapted to operate upon have square heads. These chutes are adapted to receive the bolts from the primary shear and to deliver them to the secondary shear. The chute K is formed of the sides $k$ and $k'$ and the chute L of the sides $l$ and $l'$, which are preferably integral, respectively. They are provided with supports or legs $k^2$ and $l^2$, which are mounted upon brackets $k^3$ and $l^3$, respectively, secured to the front of the bed of the machine. These chutes, as well as the feed-chute, as herein shown, are formed of relatively rigid members; but it will be seen that they might readily be made adjustable within certain limits, so as to accommodate bolts of different sizes. In the receiving-chute the bolts are arranged with their untrimmed fins in alinement therewith. Hence in order to trim off these fins it is necessary to present them to the cutters of the secondary shear, which are alike in every respect to the corresponding cutters of the primary shear just described, with the fins arranged transversely of the chute. This is accomplished by providing a deflector or pusher M, which is adapted to reciprocate in the plane of the delivery-chute and to deflect the bolts into it from the receiving-chute. (See Figs. 4, 5, and 9.) This deflector is mounted in a way M', which is preferably integral with sides $k$ and $l$ of the chutes K and L. A rod N, which is virtually an extension of the deflector, is also mounted in the way M' and serves to connect the deflector with the cross-head N', which is adapted to slide on the outer end of the shaft C'. Secured to the shaft C' is a cam-wheel $N^2$, the cam-surfaces of which contact with an antifriction-roller $n$, carried by the cross-head, whereby the deflector is advanced when the cam-wheel is rotated. As herein shown, this cam-wheel is provided with two cam-surfaces; but a larger number might be provided, if found desirable. To prevent the cross-head from a tendency to rotate as it is reciprocated by the cam-wheel, which tendency would cause the deflector and its rod to bind in their way, an arm $n'$ is provided, which is adapted to slide in a slot in the bracket $n^2$, secured to the bed of the machine. An antifriction-roller is carried by this arm to reduce its friction with the bracket. A spring $N^3$, which reacts between a collar $n^3$ on the deflector-rod and the way M', serves to return the deflector to its normal position after it has been advanced by the cam-wheel. To make doubly sure of its return, the cross-head is provided with a second antifriction-roller $n^4$, which is located on the opposite side of the cam-surfaces from the roller $n$. The deflector M has a yielding connection with the rod N, which is effected by a spring $m$, which reacts between the rod and a collar $m'$, secured to the stem of the deflector. A nut $m^2$, screwed into the end of the rod, serves to hold the deflector and its coöperative parts in their proper relative position. In order to support the bolt at the intersection of the two chutes, a portion $k^4$ of the receiving-chute extends across the path of the deflector, as shown in Figs. 5 and 9. A slot $M^3$ is provided in the end of the deflector, which is adapted to receive the portion $k^4$ of the chute when the deflector is forwarded. The lower portion of the deflector, which contacts with the body of the bolt, is made slightly longer than the upper portion, which contacts with the head, so that both strike the bolt at the same instant, whereby the bolt is forwarded without tilting it, which would produce a tendency to catch and bind in the chute. To make more positive the operation of the parts as above described, a slot is provided in the way, in which slides the head of a set-screw $m^4$, secured to the deflector.

To insure the passage of the bolts in the receiving-chute K, a second forwarder O is provided, which, as herein shown, is of the revolving type, the operation of which is very similar to that of the rotating forwarder I' above described. This forwarder is journaled on a stud-bolt $o$, adjustably secured to a bracket $o'$, which is adjustably secured to the way M', as shown in Fig. 9. It consists of a disk $o^2$, to which is secured a loop $o^3$ of some flexible material, preferably leather, which loop is provided with a weight $O^4$ at its extremity. The forwarder is mounted so that the weighted loop as it is revolved comes in contact with the heads of the bolts in the chute and drags them along with it down to the bottom thereof in case there is a tendency to catch and stick fast. It is driven from the shaft D of the primary shear by means of the belt $o^5$.

To preserve the alinement of the bolt in the receiving-chute K, which is immediately in front of the forwarder, until it is deflected thereby, the gate P is provided, which is raised by the bolt as it is deflected into the delivery-chute L. For convenience this gate is pivotally connected with a bar $p$, secured to the top of the pillow-blocks $b'$, as shown in Fig. 4. The delivery-chute is provided with channels $l^4$, one on each side, which are adapted to receive the fins which still remain on the heads, as shown in Figs 9 and 10. At the upper end of this chute these channels are slightly enlarged to permit the bolt to be deflected readily therein. At the lower end is provided a retarding-plate $l^5$, which corresponds with the retarding-plate $j^2$, above described, with the exception that it has no alining portion, since the heads are already in alinement. It serves simply to prevent more than one bolt passing into the secondary shear at a time.

The secondary shear, as above noted, is constructed and operated in substantially the same manner as the primary shear. The upper pair of cutters thereof are provided with a stripper $f'$, which is mounted on a bracket $f^2$, secured to the bearing-frame B', as shown in Fig. 4. A deflector-plate $b^4$ is located at the exit of the secondary shear to direct the bolts after they have been trimmed into a suitable receptacle provided for the purpose.

When the circular cutters become dulled, they are removed and ground in the usual manner and replaced in the machine for further use. To facilitate the removing and replacing of the upper cutters, they are preferably made in sections, as shown in Fig. 5, so that the removal of the shaft carrying them is not necessitated. When in position, the cutters are keyed to the shaft to prevent their turning and the sections thereof held together in operative relation by means of nuts $d^3$, which press against collars $d^4$, having conical recesses in their inner faces which are adapted to fit over corresponding conical hubs $d^5$ on the cutters. These cutters are preferably made by slitting them diametrically almost to their circumference and finally breaking them apart after they have been hardened and ground. If found desirable, the washers which space the cutters apart may also be made in sections. As herein shown, a small pulley $o^6$ is slipped over one of the nuts and collars of the primary shear, providing means for driving the revolving forwarder O. If desired, this pulley might readily be made integral with either the nut or the collar. The lower cutters are mounted on their respective shafts by means of the flange-nuts $e^3$, which are screwed thereon. On these nuts the cutters are screwed. The threads of both the nuts and cutters are right and left hand, respectively, depending upon their direction of rotation. To remove these cutters, the flange-nut on either the shaft C' or the shaft E' is unscrewed until the cutters abut, when upon further unscrewing the shaft is pushed outward through its bearings until the cutter and its nut are removed. The spur-gears $c'$ and $e'$ are mounted on their respective shafts, so as to permit this longitudinal movement, as above described. After one cutter has been removed the remaining one is readily unscrewed from its flange-nut or both nut and cutter removed from their shaft, as desired. One of the flange-nuts of the primary shear is herein shown provided with a groove for the belt $i^4$ of the rotating forwarder I'. The set-screws $b^4$ and $b^5$ provide means for adjusting the upper pair of cutters in proper relation to the lower pair after they have been ground. In order that the proper relation between the chutes and the lower pair of cutters of each shear may be preserved regardless of the diameter of the cutters, each chute is provided with a hinged portion adjacent thereto. The feed-chute has the portion $I^2$, the receiving-chute the portion K', and the delivery-chute the portion L', as best shown in Figs. 4 and 6.

The operation of the machine, it is thought, will be understood from the foregoing description of the construction and function of its several parts without further comment. It might be summarized, however, as follows: A quantity of bolts of the general form shown at 1 of Figs. 12 and 13 is shoveled into the hopper and the machine set in motion. A number of bolts are raised by the feed-plate at each vibration thereof and delivered into the feed-chute, where they are hurried along by the rotating forwarder, the retarding-wheel preventing their piling on top of each other as they pass down the chute and the retarding-plate below preventing any further tendency in this direction. The heads of the bolts are then alined with the chute by the alining-plate and delivered to the primary shear between the upper pair of cutters, the body of the bolt hanging between the lower pair. As the bolts pass through this shear the fins on two opposite sides of the heads are trimmed off, as shown at 2 and 3 of Figs. 12 and 13, when they are delivered into the receiving-chute, where they are forwarded into the path of the deflector. Here they are deflected into the delivery-chute, from which they are delivered to the secondary shear. In this shear the remaining fins of a square-headed bolt are trimmed off, as shown at 4 of Figs. 12 and 13, after which they are delivered to a suitable receptacle.

It will be seen that the invention is subject to a variety of modifications without departing from the spirit thereof. Feeders of different designs might be employed. Ducts or channels having forwarding means other than gravity might readily replace those herein shown in the form of chutes. Other means for alining the heads might be used and found equally effective. Cutters might be arranged so as to trim the fins from the opposite sides of the heads other than simultaneously. A variety of deflectors might be employed to present the bolts to the succeeding cutters, and many different forms of cutters might as readily be used as those herein shown. Hence I do not wish to be limited to this exact construction.

Having thus described my invention, what I claim as new, and desire to secure by Letters Patent, is—

1. In a blank-trimming machine, the combination of a primary rotary shear, a feeder therefor, a feed-chute connecting said shear and feeder, retarding and alining plates for said chute, a secondary rotary shear, a stripper for each of said shears, chutes connecting said shears and having hinged portions adjacent thereto, which chutes intersect at an angle corresponding to the angle between the sides of the blanks, a yielding deflector at the intersection of said chutes, and means for maintaining the blanks in alinement with said chute.

2. In a blank-trimming machine, the combination of a plurality of rotary multiple shears, a stripper for each of said shears, chutes connecting said shears and having hinged portions adjacent thereto, which chutes intersect at an angle corresponding to the angle between the sides of the blanks, a yielding deflector located at the intersection of said chutes, and means for maintaining the blanks in alinement with said chutes and in the relative position in which they are operated upon by the adjacent shears.

3. In a blank-trimming machine, the combination of a primary rotary shear, a secondary rotary shear, a stripper for each of said shears, receiving and delivery chutes connecting said shears and having hinged portions adjacent thereto, which chutes intersect at an angle corresponding to the angle between the sides of the blanks, a revolving forwarder for said receiving-chute, a deflector at the intersection of said chutes, a cam-wheel driven by said primary shear, a cross-head operated by said cam-wheel, a yielding connection between said cross-head and deflector, a gate opposite said deflector, and means for maintaining the blanks in said chutes in the position in which they are operated upon by the adjacent shears.

4. In a blank-trimming machine, a multiple shear comprising rotary cutters mounted upon separate shafts having a common axis, coöperating cutters mounted upon the same shaft, and a means for driving said cutters.

In testimony whereof I have signed my name to this specification in the presence of two subscribing witnesses.

JAMES H. HASKINS.

Witnesses:
A. M. TURNER,
BELLE SUMNER ANGIER.